Aug. 10, 1965  G. M. SAWYER  3,199,250
SEED GROWTH APPARATUS
Filed April 2, 1962
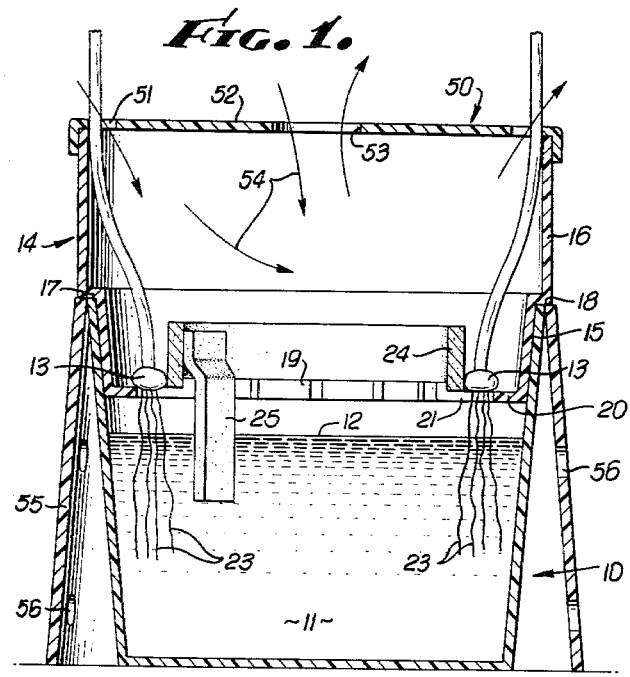
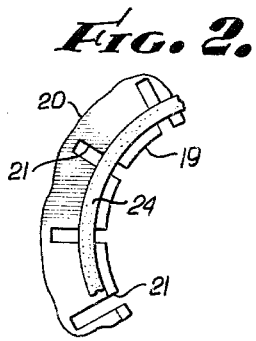
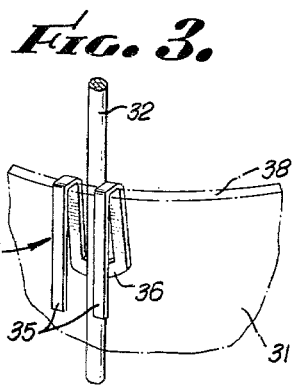
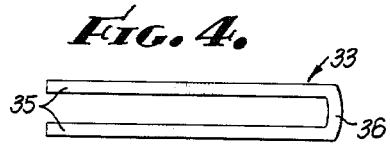
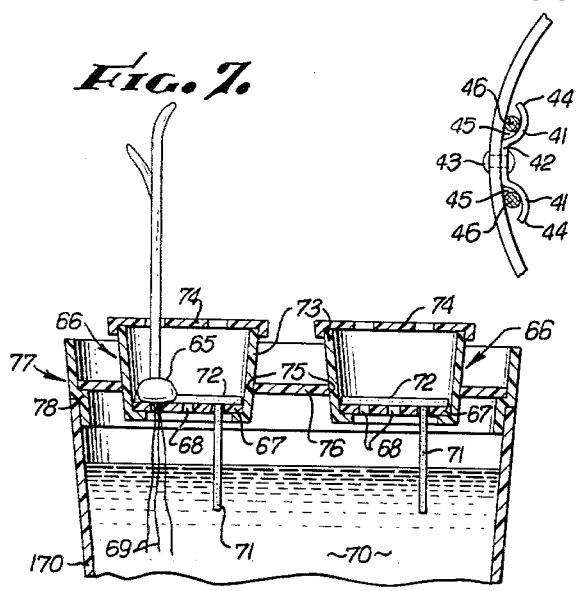
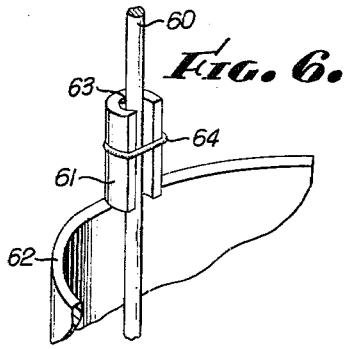
INVENTOR.
GEORGE M. SAWYER
BY White and Haeflger
ATTORNEY.

3,199,250
SEED GROWTH APPARATUS
George M. Sawyer, 725 N. Market St., Apt. 5,
Inglewood, Calif.
Filed Apr. 2, 1962, Ser. No. 184,333
5 Claims. (Cl. 47—1.2)

This invention relates generally to seed and plant growth and display means, and more particularly has to do with growth promotion equipment of a character such as will facilitate the rapid growth of seeds and plants in a display environment.

The invention is characterized in one of its aspects in the provision of seed growth display apparatus comprising an assembly including a container having a lower interior zone for hydroponics liquid and transparent side wall through which that zone is visible, together with a tray structure received downwardly within the container and supported by the latter so as to be upwardly removable from the container. The tray structure forms a vertical opening within the inside of the container, and through which roots may grow down from the seeds into the hydroponics liquid within the lower zone of the container to be viewed from the exterior. Such tray structure may be upwardly removed at any time so as to remove the seeds and roots from the container without destroying them.

Another object of the invention is to provide reduced size individually removable tray structures supported directly above the lower interior of the container, as by means of a larger tray carried by the container, for purposes as will appear.

A further feature of the invention is found in the combination with such a container of clip means typically but not necessarily having bendable tine extent within a localized upper interior region of the container near the shell. The clip means is adapted to be bent to approach the side of an upright plant stem, blocking the stem against falling from upright position within the container.

These and other objects of the invention as well as the details of illustrative embodiments will be more fully understood from the following detailed description of the drawings, in which:

FIG. 1 is a showing of the interior of the container and illustrating the visibility of seed growth therein;

FIG. 2 is a plan view showing of a fragmentary portion of the tray structure;

FIG. 3 is a fragmentary perspective showing of a container together with clip means holding a plant stem in upright position near the wall or shell of the container;

FIG. 4 shows the clip means of FIG. 3 before it is attached to the container;

FIG. 5 is a fragmentary plan view of a section of the container shell to which a modified clip means is attached;

FIG. 6 shows a further modified clip means; and

FIG. 7 shows a modified tray structure including larger and smaller trays.

Referring first to FIGS. 1 and 2, a transparent plastic container is shown at 10 with liquid such as water 11 filling the lower interior of the container to the level 12 determining the upper extent of the liquid zone. Above that zone is located seed support means for supporting a number of seeds 13 spaced above the liquid level 12. Such seed support means includes a tray structure generally indicated at 14 to have extent 15 within the upper interior of the container and below the upper rim level thereof, and extent 16 generally above the upper rim level of the container. The tray is typically formed of transparent plastic material.

The lower section 15 is received downwardly within the upper interior of the container to an extent determined by engagement of the shoulder 17 of the tray structure with the upper rim 18 of the receptacle or container. Accordingly, the tray structure is upwardly removable at any time for purposes of removing seeds and roots from the container. One reason for so doing is to permit complete cleaning of the lower interior of the container in order better to view the root structure through the transparent wall. In this connection, it may happen that sediment or slime will build up upon the inner surface of the shell, inhibiting viewing of the root structure unless such sediment is removed as by cleaning.

The tray structure 14 contains a central vertical opening 19 through which air may freely circulate to the hydroponics liquid level. Also, the tray structure has annular shelf extent 20 containing a series of circularly spaced openings 21 through which roots may grow downwardly from seeds 13 supported upon the shelf. The location of the openings 21 is such that the roots 23 grow downwardly into the liquid 11 near the shell of the container for ready viewing.

The seeds are wetted as a result of contact with moisture absorbent material typically comprising cellulose type material, such as a blotter, extending in a ring 24 directly above the shelf extent 20 and adjacent the seeds 22. Water is supplied to the ring 24 typically through a wick 25 of cellulose or equivalent water absorbent material capable of supplying water by capillary action to the ring 24. It will be seen that the wick 25 hangs downwardly into the nutrient liquid 11 inwardly of the seed roots 23 so as not to block viewing of the latter from the exterior.

Nutrient substance may be supplied to the liquid 11 as by dropping same downwardly through the central opening 19 of the tray structure. Means is provided for supporting the seed stems against extreme lateral displacement, one such means comprising a cover 50 for the tray structure. The cover contains peripheral ports 51 to pass the stems, and may have opaque extent 52 overlying the open interior of the tray to keep the interior dark or cool, for promoting seed germination. Alternatively, the cover may have its upper surface shiny or silvered to reflect rather than absorb radiant heat or light energy. A central port 53 in the cover enables pouring of replacement water into the container 10, and the arrows 54 show how air circulation may occur as a result of the provision of the ports.

The container and tray structure may be placed or received within a shell-like light shield 55 which is also opaque and extends vertically to sufficient height outside the container and tray structure as to help support seed germination. Air may circulate through openings 56 in the shield to help cool the container and water therein.

Turning now to FIG. 3, a container 31 is shown in which a plant stem 32 is maintained in upright or upstanding position by clip means generally indicated at 33. The container 31 has a lower interior zone for receiving water and the container side wall is typically transparent so that the roots may be viewed.

The clip means 33 has bendable tine extent within a localized upper interior region of the container shell, and the tine extent is furthermore adapted to be bent to approach the side of an upright plant stem 32 for blocking the stem against falling from upright position. Typically, but not necessarily, the clip means has two spaced tines 35 of thin metallic construction, and a crosspiece 36 interconnecting the tines. The latter are adapted to receive the plant stem 32 through the opening between the tines, and they may then be bent over the rim 38 of the container to position the crosspiece 36 within the container in blocking relation to the stem below the level of the rim 38. Accordingly, the free end extents of the tines are bent downward against the exterior surface of the container as shown in FIG. 3 to hold the clip in position, lightly blocking the stem against falling from upright position. Also, the clip may be initially formed in the shape shown in FIG. 3.

An alternate clip means construction is shown in FIG. 5 to comprise at least one and preferably two bendable tines 41, and a clip base 42, attached to the upper interior shell of the receptacle or container as by a rivet 43. The tines 41 project within the container upper interior, and their free ends 44 are adapted to be bent to enclose the stem zones 45 receiving the plant stems 46. Accordingly, the tines 41 in bent condition as described block the stems against falling from upright position.

In FIG. 6 the means for supporting a seed stem 60 includes a vertical projection 61 attached to the tray structure 62, and recessed at 63 to receive the stem. The stem may then be held in the recess 63 as by a line or string 64 connected around the projection 61.

Referring to FIG. 7, the means shown for supporting a seed 65 includes a reduced size tray 66 comprising a shell 73 having a removable cap 74, and a vertically removable shelf 67. The latter is perforated at 68 to pass seed roots 69 growing downwardly into hydroponics liquid 70 in the lower interior of the container 170. Such liquid is drawn upwardly by a wick 71 and into a layer of perforate absorptive material 72 carried on the shelf 67 and contacting the seed.

The shell 73 may be tapered to downwardly fit an aperture 75 in that portion of the support means which typically comprises the shelf 76 of a relatively large tray generally designated at 77. The large tray may in turn be supported on the rim 78 of the container 170 as shown. The shelf 76 contains apertures 75 for one or more smaller trays 66, as illustrated. Direct viewing of all seed roots is aided by lifting the large trays 77, whereas if it is desired to view the roots of only one seed, the smaller tray 66 containing that seed is lifted from the larger tray 77. Lifting of the trays also permits pouring of replacement water into the container 170, and the smaller trays may be transplanted directly to the ground.

I claim:
1. Seed growth display apparatus, comprising a container having a lower interior zone for liquid and a transparent side wall through which said zone is visible, means to support a seed spaced inwardly of said wall and above said zone, means including downwardly tapering cup shaped tray structure having a shoulder supported by an upper rim of the container and having at least one seed support shelf overlying said lower zone, said tray structure having at least one vertical opening through which seed roots may grow downwardly, means adjacent the tray structure and spaced from said container upper rim to support a seed stem growing above the level of said shoulder and said shelf, and means including a liquid absorbent material carried by the tray structure in a position to contact the seed and liquid in said lower zone, said tray structure, absorbent material and said stem support means being upwardly removable from supported relation to the container to remove the roots from the container interior without disturbing the supported relationship of the seed, stem and said absorbent material relative to the tray structure.

2. The apparatus as defined in claim 1 in which the tray structure is transparent and has annular extent telescopically received downwardly into the upper interior of the container and carrying said shelf and said absorptive material therein.

3. The apparatus of claim 2 in which said tray structure includes a relatively large tray carried by the container and a relatively small tray independently removably supported by the large tray, said small tray carrying said stem support means, seed shelf and absorptive material.

4. The apparatus of claim 1 in which said stem support means comprises at least one clip attached to said tray structure for clamping the stem adjacent a side wall of the tray structure.

5. The apparatus of claim 4 in which the clip has a bendable tine to engage the stem within the tray structure.

References Cited by the Examiner

UNITED STATES PATENTS

| | | | |
|---|---|---|---|
| 796,214 | 8/05 | Hughes | 47—47 |
| 2,026,322 | 12/35 | Raines | 47—1.2 |
| 2,695,474 | 11/54 | Barstow | 47—38.1 |
| 2,774,186 | 12/56 | Wilkins | 47—47 X |
| 2,993,300 | 7/61 | Sawyer | 47—1.2 |
| 3,018,586 | 1/62 | Farley | 47—1.2 |

FOREIGN PATENTS

| | | |
|---|---|---|
| 529,794 | 7/54 | Belgium. |
| 736,078 | 9/32 | France. |
| 829,094 | 3/38 | France. |
| 8,767 | 1909 | Great Britain. |
| 25,346 | 1904 | Great Britain. |
| 312,540 | 5/29 | Great Britain. |
| 284,290 | 11/52 | Switzerland. |
| 307,899 | 9/55 | Switzerland. |

OTHER REFERENCES

German Application 1,003,489, printed Feb. 28, 1957.

ABRAHAM G. STONE, *Primary Examiner.*

T. GRAHAM CRAVER, *Examiner.*